(12) United States Patent
Matsuzawa (10) Patent No.: US 11,399,104 B2
(45) Date of Patent: Jul. 26, 2022

(54) DATA TRANSMISSION APPARATUS AND DATA TRANSMISSION METHOD FOR TRANSMITTING DOCUMENT DATA

(71) Applicant: SEIKO EPSON CORPORATION, Tokyo (JP)

(72) Inventor: Tomoki Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/101,248

(22) Filed: Nov. 23, 2020

(65) Prior Publication Data

US 2021/0160382 A1 May 27, 2021

(30) Foreign Application Priority Data

Nov. 26, 2019 (JP) .............................. JP2019-213003

(51) Int. Cl.
*H04N 1/00* (2006.01)
*H04L 67/02* (2022.01)

(52) U.S. Cl.
CPC ......... *H04N 1/00228* (2013.01); *H04L 67/02* (2013.01); *H04N 1/00206* (2013.01)

(58) Field of Classification Search
CPC ................................................ H04N 1/00228
USPC ......................................................... 358/1.15
See application file for complete search history.

(56) References Cited

U.S. PATENT DOCUMENTS

| | | | | |
|---|---|---|---|---|
| 2002/0196479 A1* | 12/2002 | Simske | ............. | H04N 1/00795 358/474 |
| 2014/0043642 A1* | 2/2014 | Yasuoka | ............ | H04N 1/00973 358/1.14 |
| 2019/0191038 A1* | 6/2019 | Naito | ................. | G06K 9/00463 |
| 2020/0304652 A1* | 9/2020 | Suzuki | ............... | H04N 1/32122 |
| 2020/0322500 A1* | 10/2020 | Mogaki | ................. | G06N 3/084 |

FOREIGN PATENT DOCUMENTS

JP 2017-005574 A 1/2017

* cited by examiner

*Primary Examiner* — Jacky X Zheng
(74) *Attorney, Agent, or Firm* — Workman Nydegger (57) ABSTRACT

A transmission apparatus includes: an acquisition unit that acquires document data; an analysis unit that analyzes the document data acquired by the acquisition unit; a storage unit that stores destination information in which a destination of the document data and information for transmission are associated with each other; a determination unit that determines, based on an analysis result of the analysis unit and the destination information stored in the storage unit, a candidate for the destination of the document data; a processing unit that executes processing based on the candidate; and a transmission unit that transmits, based on the processing, the document data.

16 Claims, 5 Drawing Sheets

DATA TRANSMISSION APPARATUS AND DATA TRANSMISSION METHOD FOR TRANSMITTING DOCUMENT DATA

The present application is based on, and claims priority from JP Application Serial Number 2019-213003, filed Nov. 26, 2019, the disclosure of which is hereby incorporated by reference herein in its entirety.

BACKGROUND

1. Technical Field

The present disclosure relates to a data transmission apparatus and a data transmission method.

2. Related Art

A known data transmission apparatus reads and transmits a document. An apparatus described in JP-A-2017-5574 reads destination information from a document and transmits the document to a destination corresponding to the read destination information.

The configuration described in JP-A-2017-5574 may not be able to transmit the document to an appropriate destination when the appropriate destination is not described in a readable format on the document.

SUMMARY

An aspect of the present disclosure is a data transmission apparatus including: an acquisition unit that acquires document data; an analysis unit that analyzes the document data acquired by the acquisition unit; a storage unit that stores destination information; a determination unit that determines, based on an analysis result of the analysis unit and the destination information stored in the storage unit, a candidate for a destination of the document data; a processing unit that executes processing based on the candidate; and a transmission unit that transmits, based on the processing, the document data.

The above data transmission apparatus may further include a display unit, and the processing unit may cause the display unit to display the candidate.

The above data transmission apparatus may further include an input unit, and when a destination different from the candidate is input by the input unit, the processing unit may cause the display unit to display that the destination input is different from the candidate.

In the above data transmission apparatus, the processing executed by the processing unit may be processing to determine the candidate to be the destination of the document data.

The above data transmission apparatus may further include a setting unit that performs setting for a transmission function, and the setting unit may perform setting whether to perform automatic transmission by the transmission unit to the destination determined by the processing unit.

In the above data transmission apparatus, the storage unit may store the analysis result of the analysis unit, and the determination unit may determine, based on the analysis result stored in the storage unit, the candidate.

The above data transmission apparatus may further include a learning unit that learns the analysis result stored in the storage unit, and the determination unit may determine, based on a result of the learning by the learning unit, the candidate.

In the above data transmission apparatus, the storage unit may store a transmission history of transmitting the document data by the transmission unit, and the learning unit may perform learning based on the transmission history stored in the storage unit.

In the above data transmission apparatus, the analysis unit may analyze at least the document data indicating a format of a document or the document data obtained by imaging the document.

Another aspect of the present disclosure is a data transmission method including: acquiring document data; analyzing the document data acquired; determining, based on destination information and an analysis result of the document, a candidate for a destination of the document data; executing processing based on the candidate; and transmitting the document data.

DESCRIPTION OF EXEMPLARY EMBODIMENTS

Herein, an embodiment is described with reference to the drawings.

Figure 1:
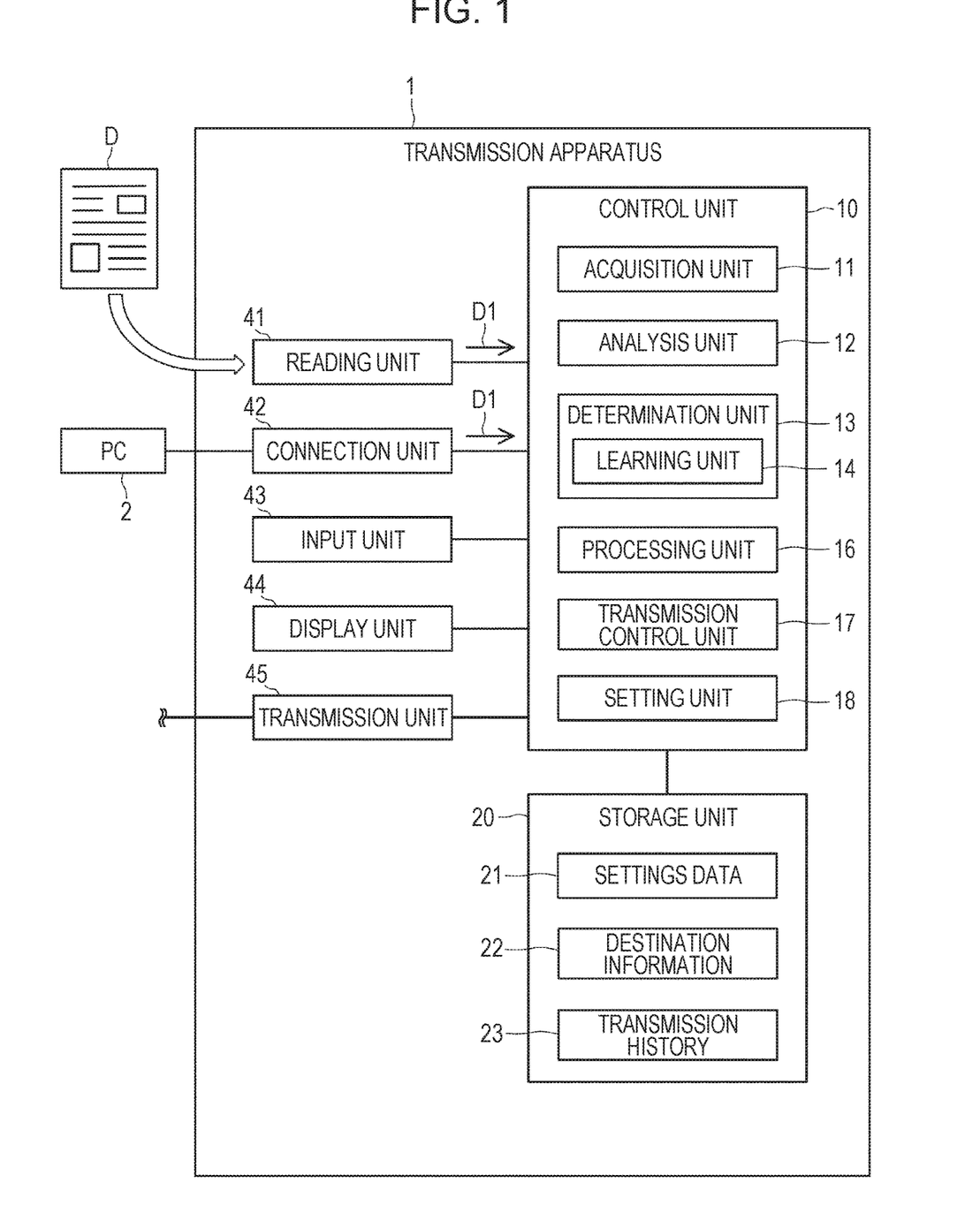
FIG. 1 is a block diagram of a transmission apparatus.

FIG. 1 is a block diagram of a transmission apparatus 1. The transmission apparatus 1 includes a control unit 10, a storage unit 20, a reading unit 41, a connection unit 42, an input unit 43, a display unit 44, and a transmission unit 45.

The transmission apparatus 1 is a data transmission apparatus which reads a document D, such as paper or a sheet, by using the reading unit 41, and transmits data of the read document D by using the transmission unit 45 via a communication line. For example, the transmission apparatus 1 is a facsimile which performs communication via a public switched telephone network or an IP telephone network.

The reading unit 41 optically reads the document D before transmission and outputs image data. The reading unit 41 is, for example, an image sensor which includes a CCD or a CMOS or an optical scanner which includes a transport mechanism for transporting the document D. CCD stands for a charge coupled device. CMOS stands for a complementary metal oxide semiconductor.

In the present embodiment, as an example, the transmission apparatus 1 reads the document D on a page-by-page basis by using the reading unit 41 to generate document data D1 which is image data of the entire page of the document D. The document data D1 is, for example, image data obtained by imaging one page of the document D. The document data D1 may be data having an image file format. In this case, the document data D1 may be a file including image data of one page or a file including image data of a plurality of pages. The document data D1 may be data indicating a format of the document D.

The connection unit 42 is a communication interface which is connected to an external apparatus different from the transmission apparatus 1 and transmits and receives data to and from the external apparatus. The connection unit 42 may be a wired interface including a terminal, such as a USB connector or an Ethernet connector, and an interface circuit, or may be a wireless communication interface. The type of the external apparatus is not limited to any particular type. Examples of the external apparatus include a computer and a semiconductor memory device. FIG. 1 illustrates an example in which a personal computer 2 is connected to the connection unit 42. USB stands for Universal Serial Bus. Ethernet is a registered trademark. In the following description, the personal computer is abbreviated as PC.

The input unit 43 includes an operation unit which includes, for example, an operation panel including a switch and a button, or a touch panel. The input unit 43 receives an input from a user and outputs, to the control unit 10, data indicating the content of the input.

The display unit 44 includes a display screen which includes, for example, a liquid crystal display panel and displays characters or images on the display screen in accordance with control by the control unit 10.

The transmission unit 45 is connected to a communication line and transmits data in accordance with control by the control unit 10. The transmission unit 45 is, for example, a device including a connector to which a communication cable is connected and a communication circuit. The transmission unit 45 is connected to the public switched telephone network or the IP telephone network. IP stands for Internet Protocol. In the present embodiment, the transmission unit 45 is connected to a telephone line and transmits the document data D1 by facsimile to a telephone number, as a destination, designated by the control unit 10.

The control unit 10 includes a processor, such as a CPU or a microcomputer, which executes a control program to control each unit of the transmission apparatus 1. The control unit 10 may include a ROM which stores, in a nonvolatile manner, a program executed by the processor and/or a RAM which constitutes a work area of the processor, or may include other peripheral circuits. CPU stands for a central processing unit. ROM stands for read-only Memory. RAM stands for random access memory.

The control unit 10 includes an acquisition unit 11, an analysis unit 12, a determination unit 13, a processing unit 16, a transmission control unit 17, and a setting unit 18. Each of these units is implemented through cooperation of software and hardware by the processor of the control unit 10 executing the program stored in the storage unit 20.

The storage unit 20 is a nonvolatile storage device which is a magnetic storage device, an optical storage medium, a semiconductor memory element, or the like. The storage unit 20 stores programs executed by the processor of the control unit 10 and various data.

The storage unit 20 of the present embodiment stores settings data 21, destination information 22, and a transmission history 23.

Figure 2:
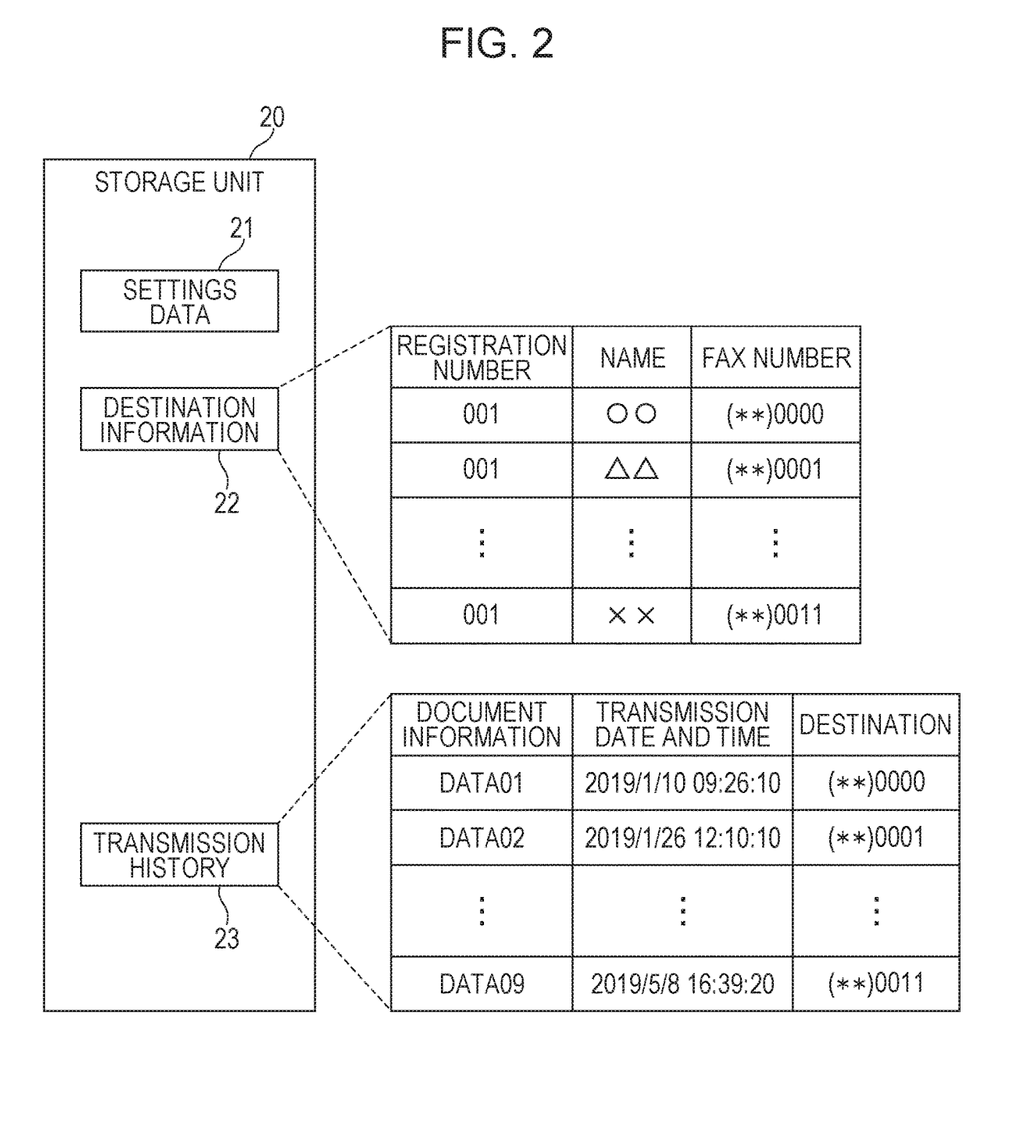
FIG. 2 is a schematic diagram illustrating an example of data stored in the transmission apparatus.

FIG. 2 is a schematic diagram illustrating a configuration example of information stored in the storage unit 20.

The settings data 21 includes a set value for each settings item related to an operation or a function of the transmission apparatus 1. For example, the settings data 21 includes set values which designate whether to enable or disable various functions included in the transmission apparatus 1.

The destination information 22 includes information about a destination. The destination information 22 can include information about a plurality of destinations. As illustrated in FIG. 2, for example, the destination information 22 includes a registration number which is unique to each destination, the name of the destination, and a FAX number, the registration number, the name, and the FAX number being associated with each other. The FAX number is a telephone number that is to be the destination of facsimile transmission.

The transmission apparatus 1 may be capable of using the destination information 22 as an address book or a contacts page. In this case, the user can perform, through the input unit 43, an input operation to select a desired destination from a plurality of destinations included in the destination information 22 and can transmit the document data D1 to the selected destination. The user can also input a desired FAX number through the input unit 43. The transmission apparatus 1 transmits the document data D1 to the input FAX number as the destination. The destination information 22 can be regarded as, for example, information which associates the destination of the document data D1 with information for transmission.

The transmission history 23 includes information about a history of transmitting the document data D1 by the transmission unit 45. The transmission history 23 includes document information about the transmitted document data D1, transmission date and time, and the destination, which are associated with each other. The document information is, for example, data of an analysis result obtained by the analysis unit 12 analyzing the transmitted document data D1. When the analysis result of the analysis unit 12 is stored in a storage area different from a storage area in which the transmission history 23 is stored, the transmission history 23 may be information which designates the stored analysis result of the document data D1. The document information may be the document data D1 itself.

The acquisition unit 11 controls the reading unit 41 to read the document D, and acquires the document data D1. When a PC 2, which is connected to the transmission apparatus 1, transmits the document data D1, the acquisition unit 11 may acquire the document data D1 received by the connection unit 42.

The analysis unit 12 analyzes the document data D1 acquired by the acquisition unit 11. When the document data D1 includes image data having a plurality of pages, the analysis unit 12 may output an analysis result of the document data D1 on a page-by-page basis or may output an analysis result of the entire document data D1.

The analysis unit 12 includes an analysis engine which includes, for example, a CNN. The analysis unit 12 analyzes the document data D1 by using the analysis engine and outputs an analysis result including, for example, a feature value of the document data D1. CNN stands for a convolutional neural network.

The analysis unit 12 may cause the analysis result of the document data D1 to be stored in the storage unit 20.

The document data D1 is not limited to image data and may be data including text. In this case, the analysis unit 12 may analyze text included in the document data D1 as a sentence and output an analysis result. For example, the analysis unit 12 vector-encodes a sentence by a method such as bag-of-words, word2vec, or doc2vec. When the document data D1 includes image data and text, the analysis unit 12 may analyze the document data D1 by a combination of processing for analyzing the image by the CNN and processing for vector-encoding the text.

The determination unit 13 acquires the analysis result of the analysis unit 12 and determines, based on the acquired analysis result, a candidate for an appropriate destination of the document data D1. The determination unit 13, for example, acquires the analysis result stored in the storage unit 20.

The determination unit 13 includes a learning unit 14 which includes artificial intelligence having a learning function. The learning unit 14 is an initial model for machine learning which includes, for example, a DNN, or a learned model obtained by learning using a learning data set executed by the initial model. DNN stands for a deep neural network.

Figure 3:
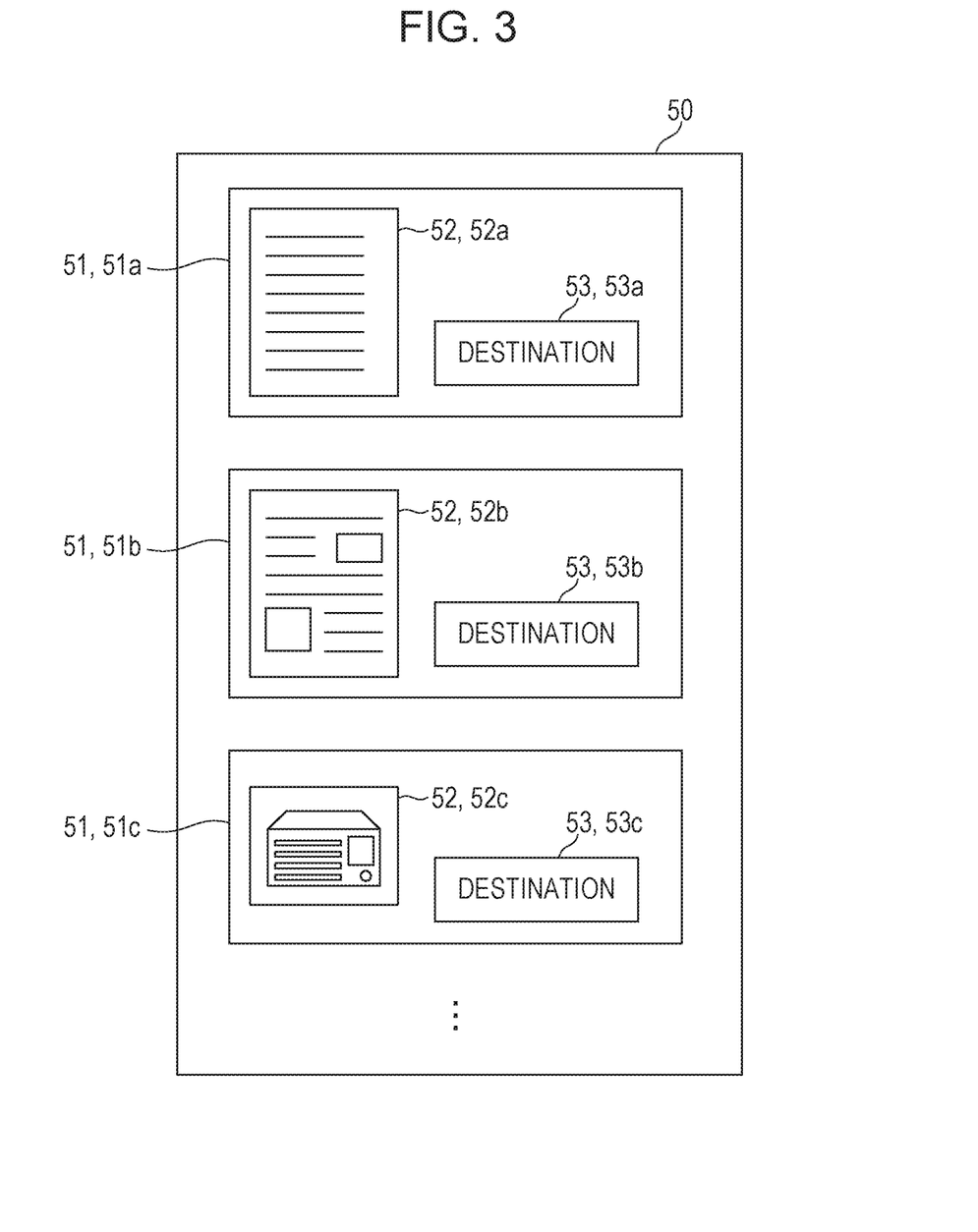
FIG. 3 is a schematic diagram illustrating a configuration example of a learning data set.

FIG. 3 is a schematic diagram illustrating a configuration example of a learning data set 50 which is used for learning by the learning unit 14.

The learning data set 50 includes pieces of learning data 51. The learning data 51 includes learning document data 52 related to the document data D1 and destination data 53 which indicates the destination of the document data D1.

The learning document data 52 is, for example, an analysis result obtained by the analysis unit 12 analyzing the document data D1.

The destination data 53 can uniquely identify the destination of the document data D1. The destination data 53 is, for example, a FAX number. The destination data 53 may be a registration number of the destination or the name of the destination included in the destination information 22.

FIG. 3 illustrates, as an example, learning data 51*a*, learning data 51*b*, and learning data 51*c* as the pieces of learning data 51. The learning data 51*a* includes learning document data 52*a* related to the document D including text. The learning data 51*b* includes learning document data 52*b* related to the document D including text and images. The learning data 51*c* includes learning document data 52*c* related to the document D including an image.

The learning unit 14 learns, by using the learning data set 50, a destination corresponding to the analysis result obtained by the analysis unit 12 analyzing the document data D1. For example, the learning unit 14 executes supervised learning using the learning data set 50. In this case, the learning document data 52 corresponds to learning data, and the destination data 53 corresponds to a ground truth label.

When an analysis result of the analysis unit 12 is input to the learning unit 14, the learning unit 14 outputs a destination. The learning unit 14 may output one destination or a plurality of destinations. For example, the learning unit 14 may output the degree of association between the input analysis result and a plurality of previously given destinations and may output a plurality of destinations each having a high degree of association.

The determination unit 13 determines one or more destinations output by the learning unit 14 to be destination candidates of the document data D1.

The learning unit 14 may be in an initial model state in which learning has not been performed at the point when the use of the transmission apparatus 1 is started. In the initial model state, when the analysis result of the analysis unit 12 is input to the learning unit 14, the learning unit 14 outputs a random destination.

The learning unit 14 may be a learned model in which learning using the basic learning data set 50 has been performed at the point when the use of the transmission apparatus 1 is started. That is, the learned model which has performed learning using the basic learning data set 50 may be installed in the transmission apparatus 1.

The learning unit 14 performs learning using a history of transmitting the document data D1 by the transmission apparatus 1. For example, when the document data D1 is transmitted by the transmission unit 45, the transmission apparatus 1 updates the transmission history 23. In the transmission history 23, the transmitted document data D1 or the analysis result obtained by the analysis unit 12 analyzing the document data D1 and the destination are associated with each other. When the analysis result of the analysis unit 12 is stored in the storage unit 20, the analysis result is included in the transmission history 23. The transmission apparatus 1 generates the learning data set 50 based on the transmission history 23, and the learning unit 14 performs learning using the learning data set 50. The learning unit 14 that has performed learning reflects the history of transmitting the document data D1 by the transmission apparatus 1 and outputs a destination appropriate for the document data D1.

When the learning unit 14 performs learning using the learning data set 50 including the document data D1 itself as the learning document data 52, the learning unit 14 that has performed learning outputs the destination in response to the input of the document data D1. In this case, the determination unit 13 may input to the learning unit 14 not the analysis result of the analysis unit 12, but the document data D1.

The processing unit 16 executes processing related to the destination candidate determined by the determination unit 13.

The processing executed by the processing unit 16 includes processing for causing the display unit 44 to display the destination candidate determined by the determination unit 13.

Further, when a destination is input by the input unit 43, the processing unit 16 executes processing for determining the destination input to be the destination of the document data D1. For example, the input unit 43 receives an input from the user for selecting one destination from the destination candidates displayed on the display unit 44.

The input unit 43 may be configured to enable the destination of the document data D1 to be directly input. For example, the input unit 43 may include keys for inputting numbers and receive an input of a FAX number. In this case, the processing unit 16 can determine the FAX number input by the input unit 43 to be the destination of the document data D1.

When the destination input by the input unit 43 is different from the destination candidate determined by the determination unit 13, the processing unit 16 performs notification to notify the user. For example, the processing unit 16 causes the display unit 44 to display a message or an image informing that the destination input by the user is different from the destination candidate, thereby performing notification.

The processing unit 16 may automatically transmit the document data D1 to the destination determined by the determination unit 13. When the automatic transmission is performed, the determination unit 13 determines, based on the destination output by the learning unit 14, one destination candidate, and the processing unit 16 causes the transmission unit 45 to transmit the document data D1 to the determined destination without waiting for an input from the input unit 43. The transmission apparatus 1 is capable of setting whether to perform automatic transmission.

The transmission control unit 17 controls the transmission unit 45 to transmit the document data D1 to the destination determined by the processing unit 16.

The setting unit 18 performs setting related to the operation of the transmission apparatus 1. The setting unit 18 acquires a set value input by the input unit 43 for a settings item determined in advance. The set value of each settings item is, for example, included in the settings data 21 and stored.

Figure 4:
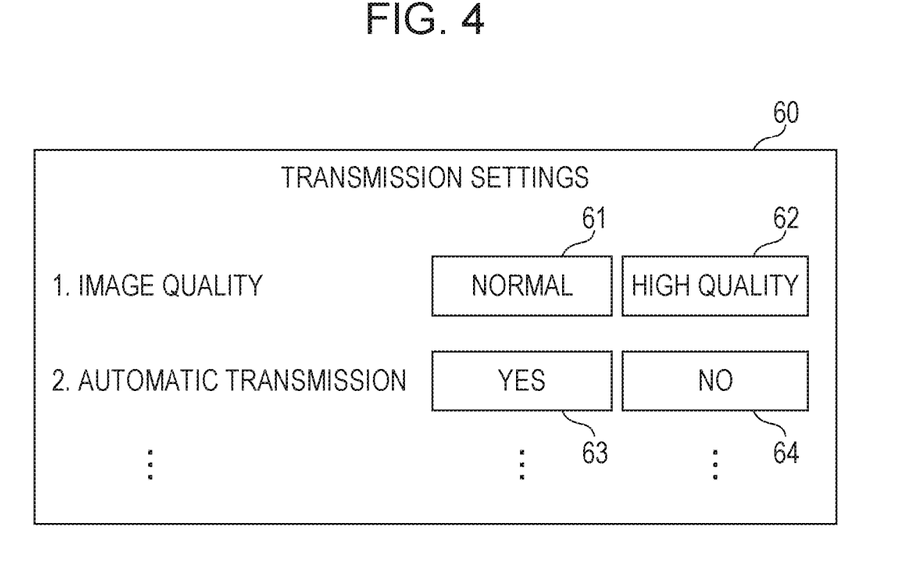
FIG. 4 is a diagram illustrating an example of a setting screen.

FIG. 4 is a diagram illustrating an example of a setting screen 60 of the transmission apparatus 1.

The setting screen 60 is displayed on the display unit 44 under control of the setting unit 18 when the function of the transmission apparatus 1 is set.

FIG. 4 illustrates an example in which the input unit 43 and the display unit 44 are configured as a touch panel. In this example, image quality and automatic transmission are displayed as settings items.

The setting screen 60 includes a setting button 61 which designates, as a set value, normal quality and a setting button 62 which designates, as a set value, high quality for the image quality settings item. The setting screen 60 includes a setting button 63 which designates, as a set value, that automatic transmission is enabled and a setting button 64 which designates, as a set value, that automatic transmission is disabled for the automatic transmission settings item.

When the user touches any of the setting buttons 61, 62, 63, and 64, the setting unit 18 acquires the set value corresponding to the touched setting button and updates the settings data 21.

Figure 5:
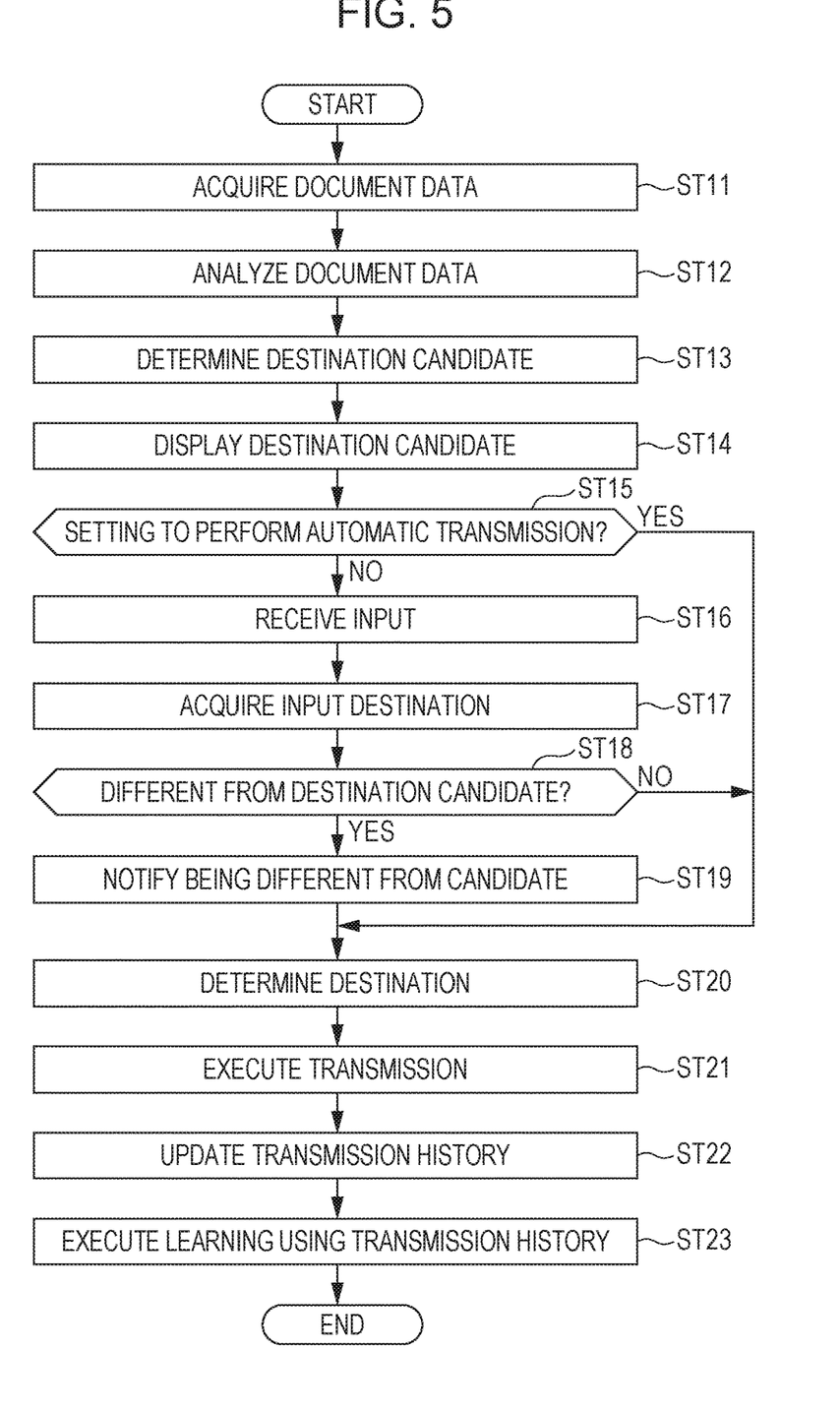
FIG. 5 is a flowchart illustrating operation of the transmission apparatus.

FIG. 5 is a flowchart illustrating operation of the transmission apparatus 1.

The acquisition unit 11 controls the reading unit 41 to read the document D and acquires the document data D1 (step ST11). Then, the analysis unit 12 analyzes the document data D1 acquired by the acquisition unit 11 and outputs an analysis result (step ST12).

The determination unit 13 outputs the analysis result of the analysis unit 12 to the learning unit 14 to cause the learning unit 14 to output a destination corresponding to the document data D1 and determines the destination output by the learning unit 14 to be a destination candidate (step ST13).

The processing unit 16 causes the display unit 44 to display the destination candidate determined by the determination unit 13 (step ST14).

The processing unit 16 determines, with reference to the set value related to automatic transmission in the settings data 12, whether a setting to perform automatic transmission has been made (step ST15). When automatic transmission is enabled (step ST15; YES), the operation of the processing unit 16 shifts to step ST20 described below.

When automatic transmission is disabled (step ST15; NO), the input unit 43 receives content input by the user (step ST16), and the processing unit 16 acquires the input destination (step ST17).

The processing unit 16 determines whether the input destination is different from the destination candidate determined by the determination unit 13 (step ST18). When the input destination coincides with any of the destination candidates, the processing unit 16 determines that the input destination is not different from the destination candidate (step ST18; NO) and shifts to step ST20. For example, when the input unit 43 has performed an input for selecting any of the candidates displayed on the display unit 44 as the destination, negative determination is made in step ST18.

When the input destination coincides with none of the destination candidates, the processing unit 16 determines that the input destination is different from the destination candidates (step ST18; YES), notifies the user that the input destination is different from the destination candidates (step ST19), and the operation of the processing unit 16 shifts to step ST20.

In step ST20, the processing unit 16 determines the destination of the document data D1. When automatic transmission is enabled (step ST15; YES), the processing unit 16 sets the destination candidate determined in step ST13 as the destination.

When the input destination coincides with any of the destination candidates (step ST18; YES), in step ST20, the processing unit 16 determines the input destination to be the destination to which the transmission unit 45 transmits the document data D1.

After performing the notification in step ST19, the processing unit 16 determines the input destination to be the destination of the document data D1 in step ST20. In this case, the processing unit 16 may receive, from the input unit 43, an input for correcting the destination.

Then, the transmission control unit 17 controls the transmission unit 45 to transmit the document data D1 to the destination determined in step ST20 (step ST21).

The processing unit 16 updates the transmission history 23 so as to include the analysis result of the analysis unit 12 related to the document data D1 transmitted by the transmission unit 45 and the destination determined in step ST20 (step ST22).

The determination unit 13 generates the learning data set 50 based on the transmission history 23 updated in step ST22, and the learning unit 14 performs learning using the generated learning data set 50 (step ST23).

In step ST23, the determination unit 13 may generate the learning data set 50 based on the transmission history 23 corresponding to a plurality of transmissions. For example, the determination unit 13 may generate a new learning data set 50 based on the transmission history 23 to cause the learning unit 14 to perform learning every time the number of transmissions of the document data D1 reaches a predetermined number or every time a predetermined period passes.

As described above, the transmission apparatus 1 according to the embodiment includes the acquisition unit 11 which acquires the document data D1, the analysis unit 12 which analyzes the document data D1 acquired by the acquisition unit 11, the storage unit 20 which stores the destination information 22, the determination unit 13 which determines, based on an analysis result of the analysis unit 12 and the destination information 22 stored in the storage unit 20, a candidate for the destination of the document data D1, the processing unit 16 which performs processing based on the candidate, and the transmission unit 45 which transmits, based on the processing, the document data D1.

A data transmission method executed by the transmission apparatus 1 includes acquiring the document data D1, analyzing the acquired document data D1, determining, based on the destination information 22 and an analysis result of the document data D1, a candidate for a destination of the document data D1, executing processing based on the candidate, and transmitting the document data D1 by using the transmission unit 45.

According to the transmission apparatus 1 and the data transmission method in the transmission apparatus 1, the destination candidate is determined using the result of analyzing the document data D1 and the destination information 22. Thus, an appropriate destination candidate can be obtained. Accordingly, for example, even when the destination is not specified on the document D1, the document data D1 can be transmitted to an appropriate destination in accordance with the destination candidate.

The transmission apparatus 1 includes the display unit 44, and the processing unit 16 causes the display unit 44 to display the destination candidate. Thus, the user of the transmission apparatus 1 can obtain, based on the display by the display unit 44, information about the destination candidate.

The transmission apparatus 1 includes the input unit 43. When the input unit 43 inputs a destination different from the candidate, the processing unit 16 causes the display unit 44 to display that the input destination is different from the candidate. Thus, it is possible to notify the user that the destination input by the user may be an inappropriate destination.

The processing executed by the processing unit 16 in the transmission apparatus 1 includes processing for causing the display unit 44 to display the candidate. Thus, the user can obtain the destination candidate determined from the analysis result of the document data D1. Thus, the user can determine the destination of the document data D1 after recognizing the destination candidate.

The processing executed by the processing unit 16 in the transmission apparatus 1 determines the candidate to be the destination of the document data D1. For example, the processing unit 16 performs an operation of automatically transmitting the document data D1 to the destination candidate. Thus, the document data D1 can be promptly transmitted to the destination determined from the analysis result of the document data D1.

The transmission apparatus 1 includes the setting unit 18 which performs setting for the transmission function. The setting unit 18 performs setting whether to perform automatic transmission by the transmission unit 45 to the destination determined by the processing unit 16. Accordingly, it is possible to set whether to perform automatic transmission according to a request of the user.

In the transmission apparatus 1, the storage unit 20 stores the analysis result of the analysis unit 12, and the determination unit 13 determines the candidate based on the analysis result stored in the storage unit 20. Thus, the result of the analysis unit 12 analyzing the document data D1 can be used in the determination of the destination candidate. In addition, the analysis result stored in the storage unit 20 can be used, for example, in generating the transmission history 23.

The transmission apparatus 1 includes the learning unit 14 which learns the analysis result stored in the storage unit 20. The determination unit 13 determines the candidate based on a result of the learning by the learning unit 14. Thus, the learning can be performed using the document data D1 which is actually transmitted by the transmission apparatus 1. Thus, it is possible to determine the destination candidate corresponding to a use condition of the transmission apparatus 1.

The storage unit 20 stores the transmission history 23 of transmitting the document data D1 by the transmission unit 45. The learning unit 14 performs learning using the transmission history 23 stored in the storage unit 20. Thus, the learning unit 14 can learn the correlation between the document data D1 transmitted by the transmission apparatus 1 and the destination of the document data D1 transmitted. For example, the learning unit 14 can learn the correlation between the destination input by the user through the input unit 43 and the document data D1. Thus, the destination candidate can be determined by reflecting the past use condition of the transmission apparatus 1.

The analysis unit 12 analyzes at least the document data D1 indicating the format of the document D or the document data D1 obtained by imaging the entire document D. In the above embodiment, the document data D1 is analyzed. Thus, it is possible to perform the analysis without being restricted by the format or contents of the document D to determine the destination candidate. Also when the analysis unit 12 analyzes the format of the document D, it is possible to perform the analysis without being restricted by the content such as characters and images included in the document D.

The above embodiment merely illustrates one concrete example. The present disclosure is not limited to the configuration of the above embodiment and can be implemented in various modes without departing from the gist of the present disclosure.

For example, although the above embodiment describes the function and the operation of the transmission apparatus 1 transmitting the document D, the transmission apparatus 1 may execute a function of receiving the document data D1 by facsimile communication. Further, the transmission apparatus 1 may be a transmission-only facsimile having no receiving function.

For example, although the above embodiment describes an example of the transmission apparatus 1 which reads and transmits the document D, the application target is not limited thereto. For example, the present disclosure is also applicable to an apparatus that transmits the document data D1 to an information storage area connected to a network such as the Internet and an apparatus that transmits e-mail. In this case, the destination of the document D is not limited to the FAX number and may be, for example, an Internet URL or an e-mail address. URL stands for Uniform Resource Locator.

The data transmission apparatus is not limited to the transmission apparatus 1 including the reading unit 41 and may be a modem that is connected to an apparatus such as the PC 2, which is configured to input the document data D1, and that transmits the input document data D1. The data transmission apparatus may be a communication apparatus incorporated in an apparatus such as the PC 2.

The determination unit 13 may determine the destination candidate using the learning unit 14 included in an apparatus that is connected to the transmission apparatus 1 via a communication network such as the Internet. In this case, the learning unit 14 may be configured to acquire the transmission history 23 from a plurality of transmission apparatuses 1 and learn the acquired transmission history 23.

At least some of the functional blocks illustrated in FIG. 1 may be implemented by hardware or implemented through cooperation of hardware and software. The processing units in the flowchart of FIG. 5 are divided according to main processing content to facilitate understanding of the operation of the transmission apparatus 1. Thus, the embodiment is not limited to the way of division or to the names of the processing units in FIG. 5.

The data transmission method executed by the transmission apparatus 1 can be implemented by causing the processor of the control unit 10 to execute a control program. The control program can also be stored in a computer-readable recording medium. Examples of the recording medium include a magnetic recording medium, an optical recording medium, and a semiconductor memory device, and the mode of the recording medium is not limited to any particular mode.

What is claimed is:

1. A data transmission apparatus comprising:
    an input unit;
    an acquisition unit configured to acquire document data;
    an analysis unit configured to analyze the document data acquired by the acquisition unit;
    a storage unit configured to store destination information for a plurality of destinations;
    a determination unit configured to determine, based on an analysis result of the analysis unit and the destination information for the plurality of destinations stored in the storage unit, a candidate for a destination of the document data, the candidate being at least one of the plurality of destinations stored in the storage unit;

a processing unit configured to execute processing based on the candidate; and a transmission unit configured to transmit, based on the processing, the document data, wherein, when a destination different from the candidate is input by the input unit, the processing unit causes a display unit to display a notification that the destination input is different from the candidate, the notification being a message or an image.

2. The data transmission apparatus according to claim 1, wherein
the processing unit causes the display unit to display the candidate.

3. The data transmission apparatus according to claim 1, wherein the processing executed by the processing unit is processing to determine the candidate to be the destination of the document data.

4. The data transmission apparatus according to claim 3, further comprising
a setting unit configured to perform setting for a transmission function, wherein
the setting unit performs setting whether to perform automatic transmission by the transmission unit to the destination determined by the processing unit.

5. The data transmission apparatus according to claim 1, wherein
the storage unit stores the analysis result of the analysis unit, and
the determination unit determines, based on the analysis result stored in the storage unit, the candidate.

6. The data transmission apparatus according to claim 5, further comprising
a learning unit configured to perform learning using the analysis result stored in the storage unit, wherein
the determination unit determines, based on a result of the learning by the learning unit, the candidate.

7. The data transmission apparatus according to claim 6, wherein
the storage unit stores a transmission history of transmitting the document data by the transmission unit, and
the learning unit performs the learning based on the transmission history stored in the storage unit.

8. The data transmission apparatus according to claim 1, wherein the analysis unit analyzes the document data indicating a format of a document or the document data obtained by imaging the document.

9. A data transmission method comprising:
acquiring document data;
analyzing the document data acquired;
determining, based on destination information for a plurality of stored destinations and an analysis result of the document, a candidate for a destination of the document data, the candidate being at least one of the plurality of stored destinations;
executing processing based on the candidate; and
transmitting the document data,
when a destination is input and the destination from the candidate, the processing causes display of a notification that the destination inputs is different from the candidate, the notification being a message or an image.

10. The data transmission method according to claim 9, wherein the processing is processing to cause the candidate to be displayed.

11. The data transmission method according to claim 9, wherein the processing is processing to determine the candidate to be the destination of the document data.

12. The data transmission method according to claim 11, further comprising
receiving setting whether to perform automatic transmission to the destination determined by the processing, wherein
when the setting to perform automatic transmission to the destination determined is received, the document data is automatically transmitted to the destination determined.

13. The data transmission method according to claim 9, further comprising:
storing the analysis result, wherein
the candidate is determined based on the analysis result stored.

14. The data transmission method according to claim 13, further comprising:
performing learning using the analysis result stored, wherein
the candidate is determined based on a result of the learning.

15. The data transmission method according to claim 14, further comprising:
storing a transmission history of transmitting the document data; and
performing the learning based on the transmission history stored.

16. The data transmission method according to claim 9, wherein
analyzing the document data indicating a format of a document or the document data obtained by imaging the document.

* * * * *